United States Patent [19]
Naitoh et al.

[11] Patent Number: 5,519,555
[45] Date of Patent: May 21, 1996

[54] MAGNETIC HEAD INCLUDING PBO-$V_2O_5$-$P_2O_5$ SYSTEM GLASS BONDING

[75] Inventors: Takashi Naitoh; Takashi Namekawa, both of Hitachi; Seiichi Yamada, Ibaraki; Kunihiro Maeda, Hitachi; Kenkichi Inada, Katsuta, all of Japan

[73] Assignee: Hitachi, Ltd., Tokyo, Japan

[21] Appl. No.: 283,185

[22] Filed: Aug. 3, 1994

Related U.S. Application Data

[63] Continuation of Ser. No. 482,558, Feb. 21, 1990, abandoned.

[30] Foreign Application Priority Data

Feb. 23, 1989 [JP] Japan ................................ 1-044478

[51] Int. Cl.$^6$ ............................... G11B 5/235; C03C 3/21
[52] U.S. Cl. ............................ 360/120; 360/125; 501/15; 501/45
[58] Field of Search ................................ 360/103, 119, 360/120, 125, 126; 501/15, 32, 41, 45, 46, 22, 48; 428/428, 432, 433, 692, 694 R

[56] References Cited

U.S. PATENT DOCUMENTS

| | | | |
|---|---|---|---|
| 3,520,831 | 7/1970 | Trap | 252/518 |
| 4,342,943 | 8/1982 | Weaver | 252/518 |
| 4,741,849 | 5/1988 | Naito et al. | 252/62.6 |
| 4,743,302 | 5/1988 | Dumesnil et al. | 501/17 |
| 4,794,483 | 12/1988 | Naito et al. | 360/120 |
| 4,816,949 | 3/1989 | Yamada et al. | 360/120 |
| 4,996,171 | 2/1991 | Davey et al. | 501/19 |
| 5,013,697 | 5/1991 | Akhtar | 501/46 |
| 5,116,786 | 5/1992 | Matsuura | 501/15 |

FOREIGN PATENT DOCUMENTS

| | | |
|---|---|---|
| 55-75937 | 6/1980 | Japan . |
| 62-78128 | 4/1987 | Japan . |
| 62-88109 | 4/1987 | Japan . |

*Primary Examiner*—Stuart S. Levy
*Assistant Examiner*—Jefferson Evans
*Attorney, Agent, or Firm*—Antonelli, Terry, Stout & Kraus

[57] ABSTRACT

A magnetic head for use in a magnetic recording and reproducing system, which head is excellent in magnetic properties, resistance to abrasion, durability and mass-producibility, comprises a pair of magnetic cores each having a substrate and a magnetic alloy film formed on the substrate, the cores being disposed in a manner such that the magnetic alloy films are opposed to and slightly spaced apart from each other, and glass bondings disposed between the magnetic alloy films to integrate the pair of magnetic cores, and a process for producing the same, and a magnetic recording and reproducing system using the magnetic head.

10 Claims, 7 Drawing Sheets

MAGNETIC HEAD INCLUDING PBO-V$_2$O$_5$-P$_2$O$_5$ SYSTEM GLASS BONDING

This is a continuation of application Ser. No. 07/482,558, filed Feb. 21, 1990, now abandoned.

BACKGROUND OF THE INVENTION

1. Field of the Invention

The present invention relates to a magnetic head for use in a magnetic recording and reproducing system, and more particularly, to such a magnetic head being excellent in magnetic properties, resistance to abrasion, durability, and mass producibility, and to a process for producing the same, and to a magnetic recording and reproducing system using the magnetic head.

2. Description of Related Art

There have been employed ferrites as magnetic core material in conventional magnetic heads. For bonding magnetic cores in the heads, non-magnetic glasses having a thermal expansion coefficient matching with that of ferrites, and a bonding temperature of about 700° C. have been used taking account of requirements on resistance to adverse environment conditions, resistance to abrasion, and strength. Generally, as glasses have a higher bonding temperature, they become lower in thermal expansion coefficient, and higher in resistance to weather, resistance to abrasion, and strength.

Recently, in order to increase greatly a recording density of magnetic recording and reproducing systems such as VTRs and the like, an attempt has been to increase the coercive force of recording mediums and the speed of recording tapes and disks. In connection with this, magnetic alloy films exhibiting a saturation magnetization of not less than 8000 G have been employed as materials for the magnetic cores used in the magnetic heads. Such magnetic heads may have a structure where a pair of magnetic cores each having a magnetic alloy film formed on a substrate are abutted on each other face to face with a non-magnetic spacer being interposed there-between, and bonded with glasses. For this reason, when the magnetic heads are produced, both the thermal expansion coefficient of the bonding glass and of the substrate must match that of the magnetic alloy film. The most attractive alloys for use in the magnetic alloy films at present are Co based amorphous alloys and Sendust alloys (Fe—Si—Al system alloys). Generally, such alloys have a higher thermal expansion coefficient than that of ferrites, for example, the Co based amorphous alloys exhibit about 120×10$^{-7}$/°C. and Sendust alloys about 150×10$^{-7}$/°C. For this reason, one must employ glasses having almost the same thermal expansion coefficient as that of the magnetic alloy films to bond the magnetic cores. If a difference in thermal expansion is higher, the magnetic alloy film is stressed causing problems that the magnetic properties are impaired and that separation of the film and/or the glasses occurs. Therefore, the bonding glasses for ferrites can not be used for the heads using the magnetic alloy films. Thus, PbO—B$_2$O$_3$ system glasses containing a major component PbO which exhibit a high thermal expansion coefficient has been employed. This type of glass is characterized by having a higher thermal expansion coefficient with a higher content of PbO, and being capable of lowering its bonding temperature to 500° C. or less. For this reason, this type of glass has been particularly useful when the Co based amorphous alloys are used as the magnetic alloy films because bonding can be effected without causing crystallization of the alloys. Comparing with the bonding glasses used for ferrite heads, however, they are very inferior in mechanical properties and resistance to weather causing problems that they are susceptible to cracking, fracture, and erosion with a washing liquid during processing, assembling, or washing the magnetic heads. This has resulted in a poor yield of the magnetic heads in the production thereof. There have been another problems where the glass bondings are susceptible to scratches and abrasion when the recording tapes are allowed to run sliding on the head. These difficulties may cause adhesion of the recording mediums on the magnetic heads and deterioration of the magnetic properties. In order to overcome the difficulties, there have been proposed glass compositions and magnetic heads as described in Japanese Patent KOKAI (Laid-Open) Nos. 62-78128 and 62-88109. These prior inventions employ V$_2$O$_5$—P$_2$O$_5$—Sb$_2$O$_3$ system glasses having a thermal expansion coefficient of 100×10$^{-7}$/°C. When Sendust alloys are used as magnetic alloy films, bonding of the magnetic cores must be performed at a heat-resistance temperature, under which the alloys are kept intact, less than about 650° C. The magnetic properties of Sendust alloys are extremely deteriorated at temperatures higher than its heat-resistance temperature. Such difficulties can be avoided by PbO—B$_2$O$_3$ system glasses which permit glass bonding to be formed at lower temperatures. Since Sendust alloys have a very high thermal expansion coefficient of about 150×10$^{-7}$/°C., however, even with PbO—B$_2$O$_3$ system glasses any matching in thermal expansion coefficient between them could not be achieved. This type of glasses has at most a thermal expansion coefficient of about 130×10$^{-7}$/°C. Another problem of this type of glasses is that as the thermal expansion coefficient becomes higher, it has a lower bonding temperature, but becomes poor in mechanical properties and resistance to weather. In order to overcome these difficulties, such adhesives as disclosed in Japanese Patent KOKAI (Laid-Open) No. 61-158860 have been proposed. This prior invention intended to match the thermal expansion coefficient of the PbO—B$_2$O$_3$—SiO$_2$ system glasses containing a major component PbO to those of Sendust alloys by incorporating Na$_2$O and/or CaO into the glasses.

The prior techniques as described above do not employ suitable bonding glasses for the high performance magnetic heads using the magnetic alloy films, and therefore, could not satisfy requirements on magnetic properties, resistance to abrasion, durability, and mass-producibility. Inventions disclosed in Japanese Patent KOKAI (Laid-Open) Nos. 62-78128 and 62-88109 have caused problems that deterioration of the magnetic properties of the magnetic alloy films, and separation of the magnetic alloy films and the bonding glasses occur due to inferior matching in the thermal expansion coefficient between the magnetic alloy films and that of the bonding glasses. The invention disclosed in Japanese Patent KOKAI (Laid-Open) No. 61-158860 again have caused problems where the bonding glasses are very inferior in mechanical properties and resistance to weather so that they are susceptible to cracking, fracture, and erosion with a washing liquid during processing, assembling, or washing the magnetic heads. Moreover, the invention has another problem where the glass bondings are susceptible to scratches and abrasion when the recording tapes are allowed to run sliding on the magnetic heads.

SUMMARY OF THE INVENTION

An object of the present invention is to provide a magnetic head being superior in magnetic properties, resistance to abrasion, durability, and mass-producibility, and a process for producing the same by using a glass which have a higher deformation temperature and a higher hardness than those of prior glasses and allows its thermal expansion coefficient to match those of a magnetic alloy films.

Another object of the present invention is to provide a glass for use in the magnetic heads for achieving the aforementioned object.

Still another object of the present invention is to provide a high performance magnetic recording and reproducing system with the aforementioned magnetic heads.

In order to achieve the above objects, the present invention provides a magnetic head comprising a pair of magnetic cores each having a substrate and a magnetic alloy film formed on the substrate, which are disposed in a manner as said magnetic alloy films opposing to and slightly spaced apart from each other, and glass bondings disposed between said magnetic alloy films to integrate said pair of magnetic cores, the glass of said glass bondings being composed of a PbO—$V_2O_5$—$P_2O_5$ system glass having a thermal expansion coefficient higher than $100 \times 10^{-7}/°C$. Preferably, the bonding glass should contain at least one component selected from the group consisting of $Sb_2O_3$, $Bi_2O_3$, BaO, $Tl_2O$, $Fe_2O_3$, $TiO_2$, ZnO, CdO, MgO, and $Al_2O_3$.

In another aspect of the present invention, there is provided a magnetic head comprising a pair of magnetic cores each having a substrate and a magnetic alloy film formed on the substrate, which are disposed in a manner as said magnetic alloy films opposing to and slightly spaced apart form each other, and glass bondings disposed between said magnetic alloy films to integrate said pair of magnetic cores, the glass of said glass bondings being composed of a bonding glass satisfying all the following conditions:

(1) the thermal expansion coefficient can be controlled in the range of $100 \times 10^{-7}$ to $160 \times 10^{-7}/°C$., (2) the deformation temperature is not higher than 500° C., and (3) the micro-Vickers hardness Hv is not less than 320.

Among the above conditions, most preferably, the deformation temperature of condition (2) should be 430° C. or less, and Hv of condition (3) be 330° C. or more.

Embodiments of the magnetic alloy films for use in the magnetic heads include Co based amorphous alloys, Sendust alloys, permalloy, alperm, and Fe-C alloys. The thermal expansion coefficients of the magnetic alloy films may be $110 \times 10^{-7}$ to $170 \times 10^{-7}/°C$.

Embodiments of the substrates for use in the magnetic heads include those made of materials or non-magnetic ceramics having a thermal expansion coefficient of $100 \times 10^{-7}/°C$. or more, and a Hv of 600 or more.

The bonding glasses for use in the magnetic heads according to the present invention is of the PbO—$V_2O_5$—$P_2O_5$ system having a thermal expansion coefficient in the range over $100 \times 10^{-7}/°C$.

In an embodiment of the present invention, there is provided a glass for bonding the magnetic heads satisfying the following conditions (1) to (3):

(1) the thermal expansion coefficient can be controlled in the range of $100 \times 10^{-7}$ to $160 \times 10^{-7}/°C$., (2) the deformation temperature is not higher than 500° C., and (3) the micro-Vickers hardness Hv is not less than 320.

The glass for bonding the magnetic heads should have a content of PbO of 25 wt. % or more and a content of $V_2O_5$ of 55 wt. % or less.

In an embodiment of the present invention, the glass for bonding the magnetic heads should contain 25 to 65 wt. % PbO, 15 to 55 wt. % $V_2O_5$ and 15 to 55 wt. % $P_2O_5$ as major components. Most preferably, the glass should contain 30 to 65 wt. % PbO, 15 to 55 wt. % $V_2O_5$ and 20 to 40 wt. % $P_2O_5$. Moreover, the glass should preferably contain 20 wt. % or less of at least one component selected from the group consisting of $Sb_2O_3$, $Bi_2O_3$, and BaO. The glass should further contain 10 wt. % or less of at least one component selected from the group consisting of $Tl_2O$, $Fe_2O_3$, $TiO_2$, ZnO, CdO, MgO, and $Al_2O_3$.

In another embodiment of the present invention, there is provided a process for producing a magnetic head which comprises steps of cutting channels in a substrate to form ridges, sputtering a magnetic alloy film on the surfaces of the channels and ridges, filling a bonding glass as defined in claims in the channels at a temperature lower than the heat-resistance temperature of the magnetic alloy film, grinding off excess top portions of the glass and the magnetic alloy film on the ridges to form a flat surface having stripe-like surfaces of the magnetic alloy film exposed above the tops of the ridges and cutting the resulting body along a predetermined line to produce a pair of magnetic core blocks, sputtering a non-magnetic spacer material on the flat surface, abutting said pair of magnetic core blocks face to face with the stripe-like surfaces of the magnetic alloy film of one of the blocks mating those of the other block, bonding the blocks at a temperature below the heat-resistance temperature of the magnetic alloy film, and cutting the resulting assembly parallel to said ridges into magnetic head units.

In still another embodiment, the present invention provides a system comprising a magnetic head having the bondings formed with the glass as described above for recording informations in magnetic recording mediums and reading the informations therefrom, a means for driving the magnetic head, and a means for controlling an area where informations are processed with the magnetic head.

The magnetic head of the present invention can satisfactorily be compatible with high coercive force recording mediums which are used in the form of metal tapes and deposited tapes, and is highly preferred for use in magnetic recording and reproducing systems such as VTR and DAT as a high performance magnetic head capable of stably working at a relative velocity of recording tapes of 5.8 m/sec or more. Moreover, it can be effectively used in magnetic recording and reproducing systems for magnetic disks.

DETAILED DESCRIPTION OF PREFERRED EMBODIMENTS

Figure 1:
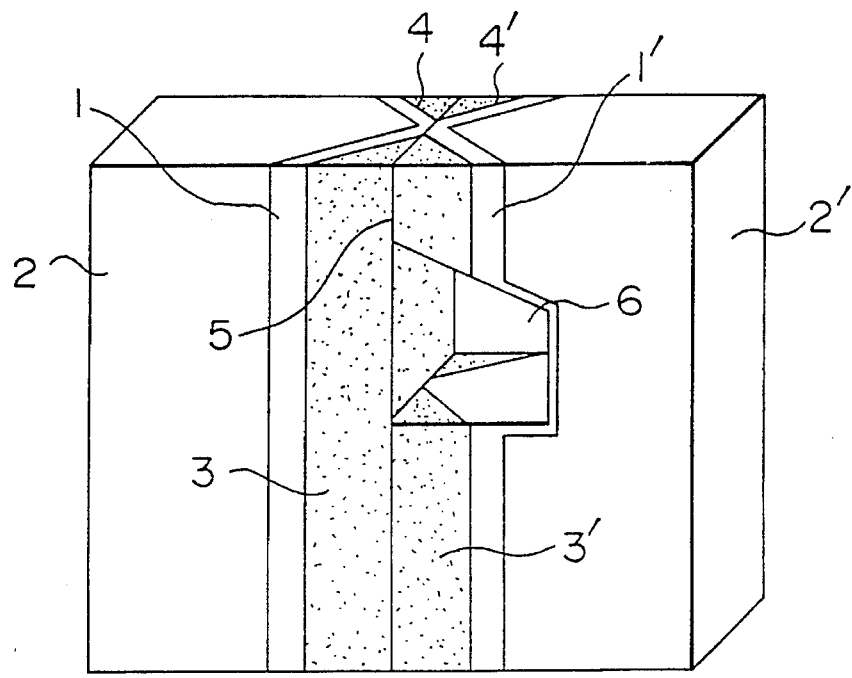
FIG. 1 shows a perspective view of an embodiment of the magnetic head according to the present invention.
Figure 2:
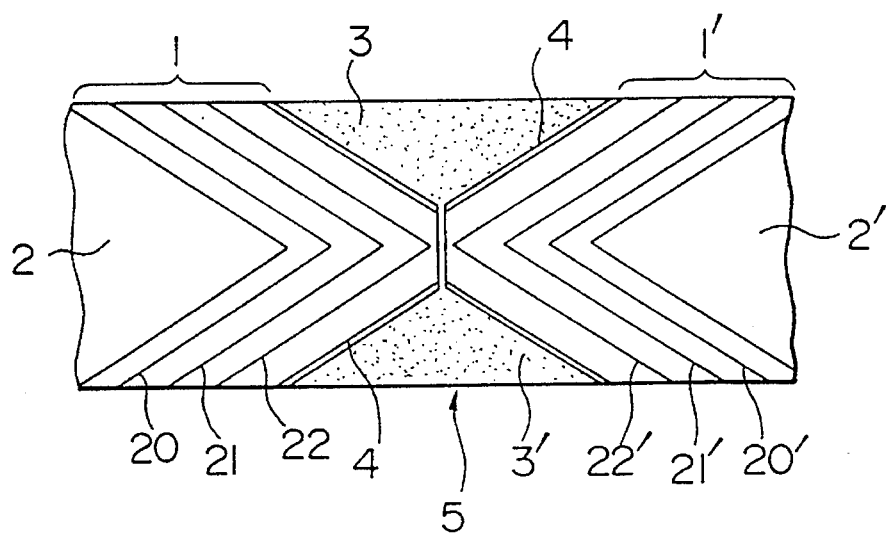
FIG. 2 shows a plane view of the top surface, on which tapes run, of the magnetic head as shown in FIG. 1, FIGS. 3 to 6 are for explanation of steps involved in an embodiment of the process for producing a magnetic head in accordance with the present invention.

The magnetic head of the present invention having improved or enhanced resistance to abrasion, durability, and mass-producibility can be produced by bonding a pair of magnetic cores, each having a structure where a magnetic alloy film is deposited on a substrate, with a $PbO-V_2O_5-P_2O_5$ system glass having a thermal expansion coefficient in the range over $100 \times 10^{-7}/°C$. without any deterioration of the magnetic properties of the magnetic alloy films.

The aforementioned $PbO-V_2O_5-P_2O_5$ system glass can freely be controlled in thermal expansion coefficient in the range of $100 \times 10^{-7}$ to $160 \times 10^{-7}/°C$. so that the thermal expansion coefficient of the glass can be matched with those of the magnetic alloy films and the substrates. This can eliminate the difficulties of deterioration of magnetic properties and separation of the magnetic alloy films and the glass due to stress applied to the magnetic alloy films. This glass has a deformation temperature as low as 500° C. or less so that it can bond the magnetic cores without thermally affecting the magnetic alloy films. Bonding with the glass may be performed at a temperature of 70° to 150° C. higher than the deformation temperature depending upon the glass composition. At a temperature higher than the range, the magnetic properties of the magnetic alloy films tend to deteriorate affecting the magnetic heads. Moreover, since this glass has a micro-Vickers hardness as high as 320 or more, the glass bondings are not susceptible to scratches even when recording tapes are allowed to run at a relative velocity of 5.8 m/sec., causing no problem of being prone to abrade. In addition to the resistance to weather and the hardness, these glasses have superior mechanical properties so that the glass bondings are not susceptible to cracking, fracture, and erosion with a washing liquid while processing, assembling, and washing magnetic heads. To achieve higher performance of the magnetic heads, one should employ a $PbO-V_2O_5-P_2O_5$ system glass according to the present invention which can be freely controlled in thermal expansion coefficient in the range of $100 \times 10^{-7}$ to $160 \times 10^{-7}/°C$., and has a deformation temperature of 430° C. or less and a micro-Vickers hardness Hv of 330 or more. At deformation temperatures of 430° C. or lower, the glass can be allowed to have a bonding temperature of not higher than 500° C. so that it can apply to various magnetic alloy films. With the glass having a micro-Vickers hardness of 330 or more, the glass bondings are less susceptible to abrasion even at a relative running speed of tapes of 5.8 m/sec or more.

In the $PbO-V_2O_5-P_2O_5$ system glass of the present invention, the component PbO contributes to an increase of the thermal expansion coefficient (controlling the thermal expansion coefficient) and enhancements of hardness and resistance to weather, the $V_2O_5$ does to a reduction of deformation temperature and an enhancement of processability, and the $P_2O_5$ does to increases of stability of glass and hardness. This glass must have a PbO content of 25 wt. % or more, or a $V_2O_5$ content of 55 wt. % or less. If PbO is less than 25 wt. %, or $V_2O_5$ is more than 55 wt. %, the thermal expansion coefficient of the glass becomes less than $100 \times 10^{-7}/°C$., not achieving a good resistance to weather. Suitable glass should have a composition comprising as major components preferably 25 to 65 wt. % PbO, 15 to 55 wt. % $V_2O_5$, and 15 to 50 wt. % $P_2O_5$. At a PbO content of higher than 65 wt. %, or a $V_2O_5$ content of lower than 15 wt. %, the glass becomes fragile so that it is less useful for a bonding glass for use in magnetic heads. At a $P_2O_5$ content of less than 15 wt. %, the glass is apt to be crystallized by heating resulting in poor bonding strength. Contrarily, at a $P_2O_5$ content of above 50 wt. %, the deformation temperature of the glass increases with an increase of the bonding temperature adversely affecting the magnetic alloy films. More preferred glass can be produced by limiting to a composition comprising as major components 30 to 65 wt. % PbO, 15 to 55 wt. % $V_2O_5$, and 20 to 40 wt. % $P_2O_5$. That is, a glass which can freely be controlled in its thermal expansion coefficient in the range of 100 to $160 \times 10^{-7}/°C$., and has a deformation temperature of not higher than 430° C. and a micro-Vickers hardness Hv of not less than 330 can be produced. In order to further improve the chemical durability and the mechanical properties of the glass, the glass should contain desirably 20 wt. % or less of at least one glass component selected from the group consisting of $Sb_2O_3$, $Bi_2O_3$, and BaO. If it contains more than 20 wt. % of such components, the deformation temperature of the glass is raised and the bonding temperature becomes too high. Particularly, with more than 20 wt. % of $Sb_2O_3$ or $Bi_2O_3$, the glass is apt to cause crystallization and its thermal expansion coefficient is too small.

Moreover, the glass may contain 10 wt. % or less of at least one component selected from the group consisting of $Tl_2O$, $Fe_2O_3$, $TiO_2$, ZnO, CdO, MgO, and $Al_2O_3$. Though $Tl_2O$ and CdO are effective to reduce the deformation temperature, more than 10 wt. % thereof tend to cause crystallization. $Fe_2O_3$, ZnO, MgO, and $Al_2O_3$ are effective to enhancement of the chemical durability and the mechanical properties of the glass, but more than 10 wt. % thereof again tend to cause crystallization accompanying with an reduction of the thermal expansion coefficient.

The use of the aforementioned bonding glass allows to effectively use Co based amorphous alloys or Sendust alloys as magnetic alloy films in the magnetic heads according to the present invention. Though these alloys are inferior in thermal properties to ferrites for use in the magnetic heads, they have a saturation magnetization of not less than 8000 G, that is, significantly higher than that of ferrites, so that they permit enhancement of performance of the magnetic heads. Moreover, the performance may be improved by using the magnetic alloy films in a multilayer form with non-magnetic insulating films. Other useful magnetic alloy films include permalloy, alperm, and Fe—C alloys. The magnetic head of the present invention contains a substrate, on which the magnetic alloy film is formed, made of a material having a thermal expansion co-efficient of not less than $100 \times 10^{-7}/°C$. and a micro-Vickers hardness Hv of not less than 600, which can be allowed to match the magnetic alloy film in thermal expansion coefficient and is less susceptible to abrasion. Preferably, the material should be non-magnetic ceramic. Due to the non-magnetic ceramic, one can obtain a magnetic head having good recording and reproducing characteristics in a wide range of frequency because the magnetic head does not exhibit any reduction of its magnetic properties in the range of high frequencies.

Therefore, the magnetic head of the present invention can effect satisfactorily recording in high coercive force recording mediums for use in metal tapes and deposited tapes, and moreover, can stably work for a longer period of time even when recording tapes are allowed to run at a higher speed relative to the magnetic head. Thus, a significantly higher recording density can be achieved in the magnetic recording and reproducing systems such as VTR and the like.

Although the tape running speed relative to the head of VHS-VTR at present is 5.8 m/sec., the relative speed will be increased in future to achieve a higher recording density with VTR. The magnetic head of the present invention is satisfactorily adaptable to a speed of higher than 5.8 m/sec.

The present invention provides a high performance magnetic head, which is excellent in resistance to abrasion, durability and mass-producibility, by bonding a pair of magnetic cores comprising a substrate having a magnetic alloy film formed on the substrate with a $PbO$—$V_2O_5$—$P_2O_5$ system glass having a thermal expansion coefficient of $100 \times 10^{-7}/°C$. or more without deteriorating the magnetic properties of the magnetic alloy film. This type of glasses can be freely controlled in thermal expansion coefficient in the range of 100 to $160 \times 10^{-7}/°C$. to match the thermal expansion coefficients of various magnetic alloy films having a high saturation magnetization. Since it has a deformation temperature as low as 500° C. or lower, moreover, it allows the bonding to form without adversely affecting the magnetic alloy films. Most useful glass for the aforementioned magnetic head is of a deformation temperature of not higher than 430° C. Moreover, this type of glasses has a micro-Vickers hardness Hv as high as 320 or more so that it can enhance the resistance to abrasion of the glass bondings. Glasses having a micro-Vickers hardness of not less than 330 are most useful for the aforementioned magnetic head. Since this type of glasses are excellent in mechanical properties and resistance to water as well as hardness, it can improve the reliability of the magnetic head. Preferably, this type of glasses should further contain at least one component selected from the group consisting of $Sb_2O_3$, $Bi_2O_3$, $BaO$, $Tl_2O$, $Fe_2O_3$, $TiO_2$, $ZnO$, $CdO$, $MgO$, and $Al_2O_3$ to additionally improve the mechanical properties and the resistance to water, thereby resulting effectively in more enhancement of the performance of the magnetic head.

The present invention will be further explained with reference to Examples.

EXAMPLES

FIG. 1 shows a perspective view of one of the typical magnetic heads. 1 and 1' designate magnetic alloy films, 2 and 2' substrates on which the magnetic alloy films are formed, and 3 and 3' glasses for bonding the magnetic cores. 4 and 4' designate reaction-preventing films for preventing the magnetic alloy films from erosion with a bonding glass. 5 designates gap-abutment which forms a working gap with a non-magnetic insulating film being placed in the gap between the abutting surfaces of the cores. 6 designates a window through which coils are wound up.

Figure 3:
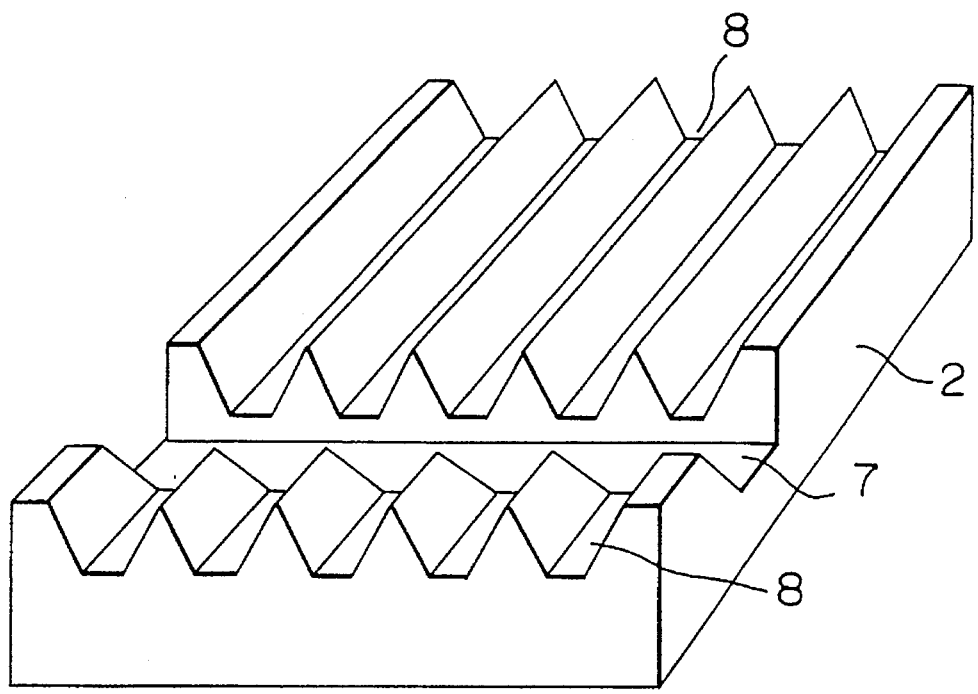
Figure 4:
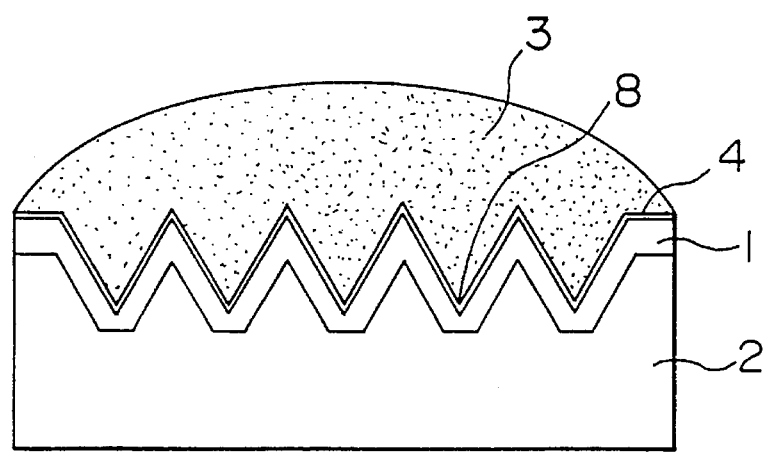
Figure 5:
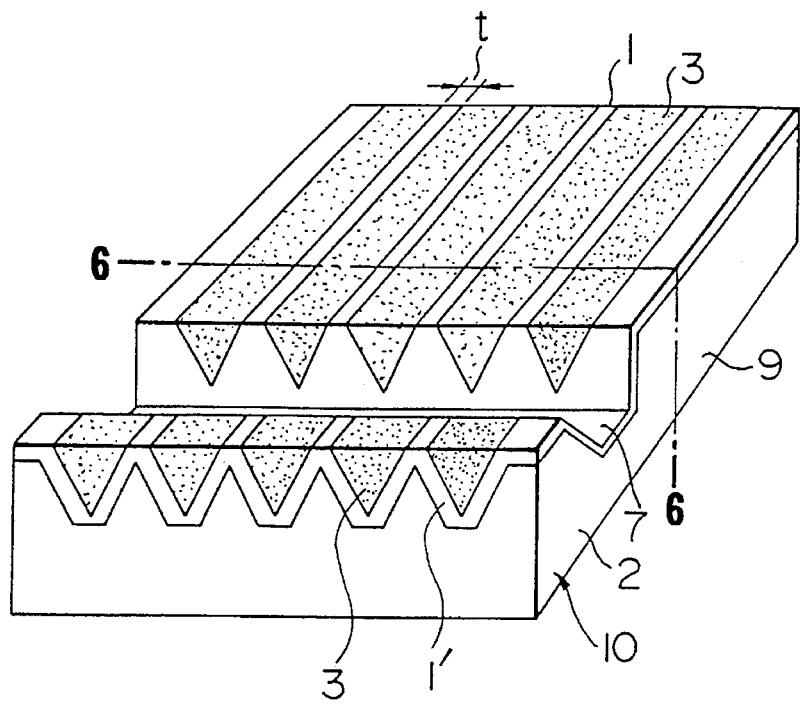
Figure 6:
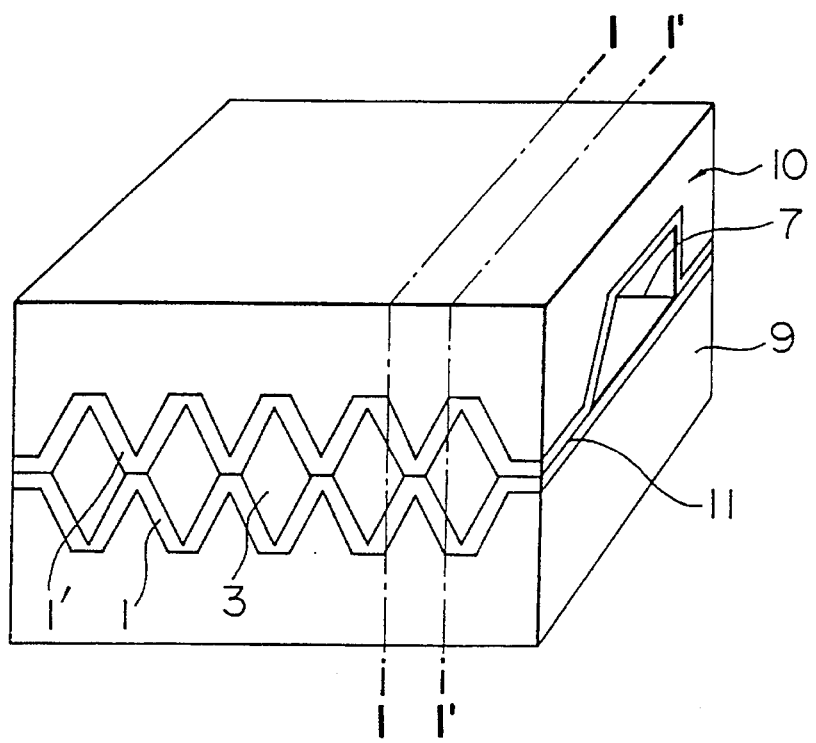

Process for producing the magnetic head as shown in FIG. 1 will be explained hereinafter. As shown in FIG. 3, Groove 7 for forming the coil-winding window and channels 8 are engraved in substrate 2 to form ridges, the top edges of which will be used for forming the gap-abutment. Next, as shown in FIG. 4, magnetic alloy film 1 and reaction-preventing film 4 are sputtered on the surfaces of the channels and the ridges, and then bonding glass 3 is filled in the channels at a temperature not higher than the heat-resistance temperature of the magnetic alloy film. This magnetic alloy film should be incorporated in a multi-layer form with non-magnetic insulating films instead of using alone as single layer. Then, as shown in FIG. 5, excess portions of the glass and the magnetic alloy film are ground off to form groove 7 for the coil-winding window and a flat surface to be abutted later, on which stripe-like flat top surfaces of the film above the ridges are exposed each having a desired track width t. Then, the whole block is cut along the broken line A to form a pair of magnetic core blocks 9 and 10. After the predetermined amount of non-magnetic material 11 for the gap is sputtered on the top flat surface to be abutted of each block, both blocks are abutted face to face as shown in FIG. 6 and bonded at a temperature not higher than the heat-resistance temperature of the magnetic alloy film. Then, the assembly is cut in sequence as along broken lines B and B' into magnetic heads as shown in FIG. 1.

Properties of the magnetic alloy films used in Examples are represented in Table 1. As can be seen from the Table, Co based amorphous alloys and Sendust alloys have a saturation magnetization twice or more as high as that of ferrites in the range of 4000 to 5000 G, so that they can greatly contribute to enhancement of the performance of the magnetic heads. However, as they have a higher thermal expansion coefficient than that of ferrites, the substrate and the bonding glass must be adjusted to have possibly similar thermal expansion coefficient. In addition, as they have a lower heat-resistance temperature than that of ferrites, bonding the magnetic cores must be performed at temperatures lower than the heat-resistance temperature.

Properties of the substrates used in Examples are summarized in Table 2. The substrates are required to have a micro-Vickers hardness Hv of at least 600 in view of the resistance to abrasion of the magnetic heads. As the substrate was required to have a thermal expansion coefficient possibly matching that of the magnetic alloy film to be formed on the substrate, the Co based magnetic alloy film, $Co_{83}$—$Nb_{13}$—$Zr_4$ indicated as Magnetic alloy film A in Table 1 was employed with the substrates indicated as a to c in Table 2. Similarly, a Sendust alloy, $Fe_{84}$—$Si_9$—$Al_7$ indicated as Magnetic alloy film B was employed with the substrates indicated as c and d in Table 2.

As glasses for bonding the magnetic cores comprising the magnetic alloy film having high saturation magnetization, $PbO$—$V_2O_5$—$P_2O_5$ system glasses have been examined. Typical glass compositions in this system and their characteristics are represented in Tables 3 through 6. A process for producing these glasses comprises mixing predetermined amounts of glass materials, melting the mixture in an electric furnace at a temperature of 1050° C. for two hours, and then pouring the melt into a selected receptor to produce glass blocks. For comparison, the compositions and characteristics of prior glasses are given in Table 7. The characteristics of each glass were determined by the following measurements:

(1) Thermal expansion coefficient and deformation temperature

The glasses were processed in the rod form of 5 mm in diameter×30 mm as samples which were measured in air at temperatures elevating at a rate of 5° C./min with a dilatometer.

(2) Micro-Vickers hardness Hv

Measurement was conducted under conditions of a loading weight of 100 gf and a loading time of 15 sec.

(3) Water resistance

Glass samples processed into the shape of a cube of 5 mm in side were immersed in 40 cc of distilled water at a temperature of 700° C. for two hours and a ratio of weight loss of each sample was determined to evaluate water resistance.

As can be seen from Table 7, prior glasses are of $PbO$—$B_2O_3$ system, and tend to have lower deformation temperature and hardness together with a tendency to reduction in water durability as their thermal expansion coefficients are higher. Glasses Nos. 62 to 64 indicated in Table 7 contained $SiO_2$ and $Al_2O_3$ to enhance mechanical properties such as hardness, and chemical properties such as water resistance. However, these oxides produce a problem of lowering thermal expansion coefficient. At present, a wide variety of bonding glasses workable at lower temperatures, which have been put into practical use, are of PbO—$B_2O_3$—$SiO_2$—$Al_2O_3$ system as used in the glasses Nos. 62 to 64. These glasses again have an insufficient hardness and a poor water resistance for glasses with which the magnetic cores containing the magnetic alloy film are bonded. Moreover, the range of their thermal expansion coefficients does not match that of various magnetic alloy films. Therefore, there have been problems as to mass-producibility, durability, and reliability of the magnetic heads. With the binary PbO—$B_2O_3$ system glass, in spite of an attempt to increase the thermal expansion coefficient thereof, one could achieve at most about $130\times10^{-7}/°C$. as indicated with glass No. 65 in Table 7 In order to increase the thermal expansion coefficient of such glasses, they must contain heavy metal oxides or alkali metal oxides, as the glasses Nos. 66 to 69 in Table 7. However, their hardness is lowered while they have a poor water resistance, which makes them useless for bonding the magnetic cores. The prior glasses, therefore, are unsuitable to bonding of the magnetic cores having the magnetic alloy film.

In the next place, the PbO—$V_2O_5$—$P_2O_5$ system glass of the present invention will be explained. This ternary system glass may produce several problems, as can been seen from Table 3. Glass No. 1 having a content of PbO of less than 25 wt. % and that of $V_2O_5$ over 55 wt. % has a low thermal expansion coefficient of less than $100\times10^{-7}/°C$. and a poor water resistance. Glass No. 9 having a $V_2O_5$ content of less than 15 wt. % and that of PbO over 65 wt. % is fragile and inferior in processability. Glasses Nos. 10 and 17 having a $P_2O_5$ content of less than 15 wt. % has a poor flowability and a low adhesive strength because they are crystallized by heating. On the other hand, glasses Nos. 16 and 23 having a content of $P_2O_5$ above 50 wt. % has too high bonding temperature because their deformation temperature is above 500° C. Other glasses in Table 3 which are within the compositional ranges of 25 to 65 wt. % PbO, 15 to 55 wt. % $V_2O_5$, and 15 to 50 wt. % $P_2O_5$ do not produce any problems as above, and are very excellent in thermal expansion coefficient, deformation temperature, hardness, and water resistance. In addition, they are superior in mechanical properties other than hardness.

Figure 7:
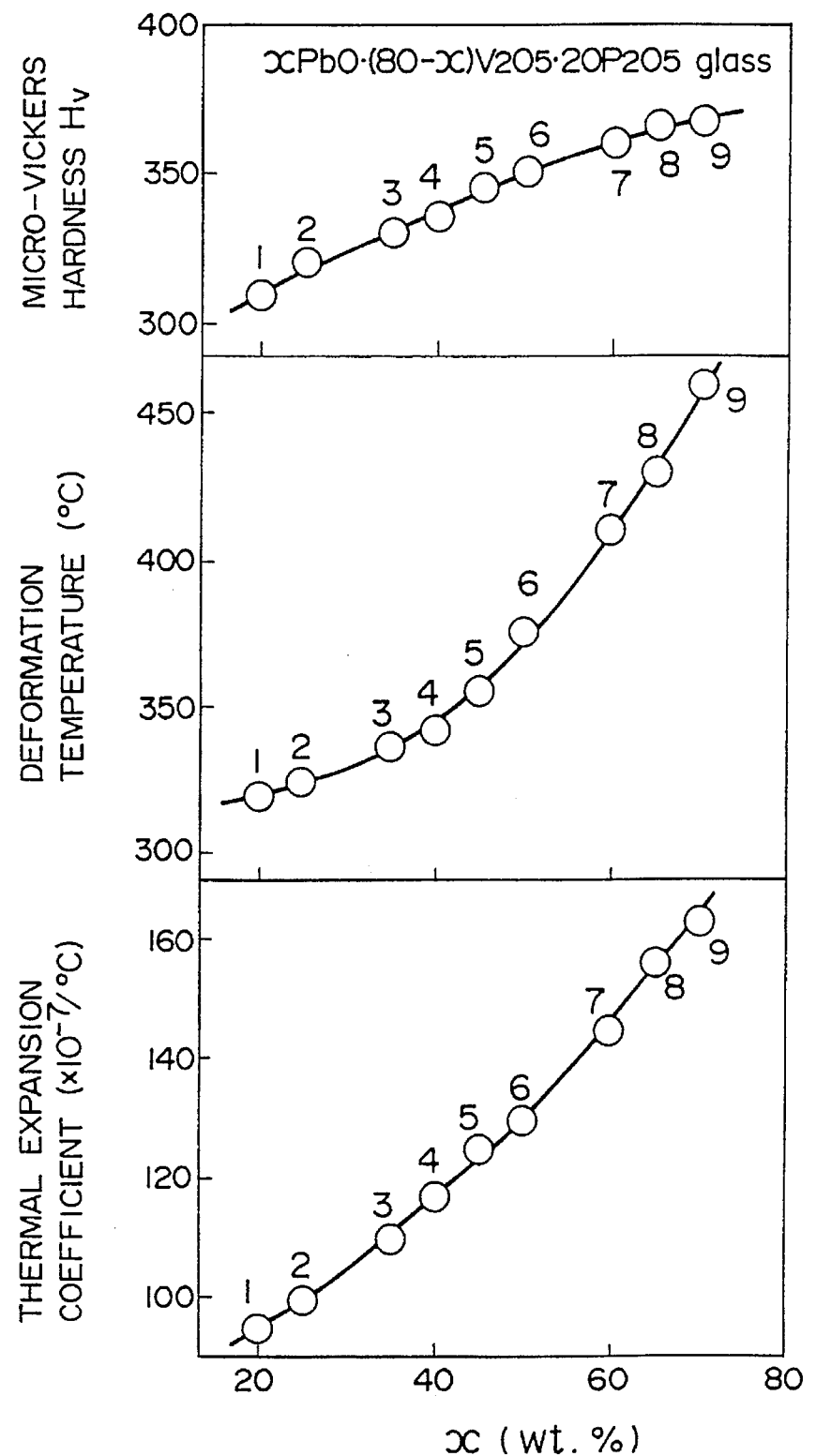
FIG. 7 shows plots of hardness, deformation temperature and thermal expansion coefficient versus composition of one of the PbO—$V_2O_5$—$P_2O_5$ system glasses.
Figure 8:
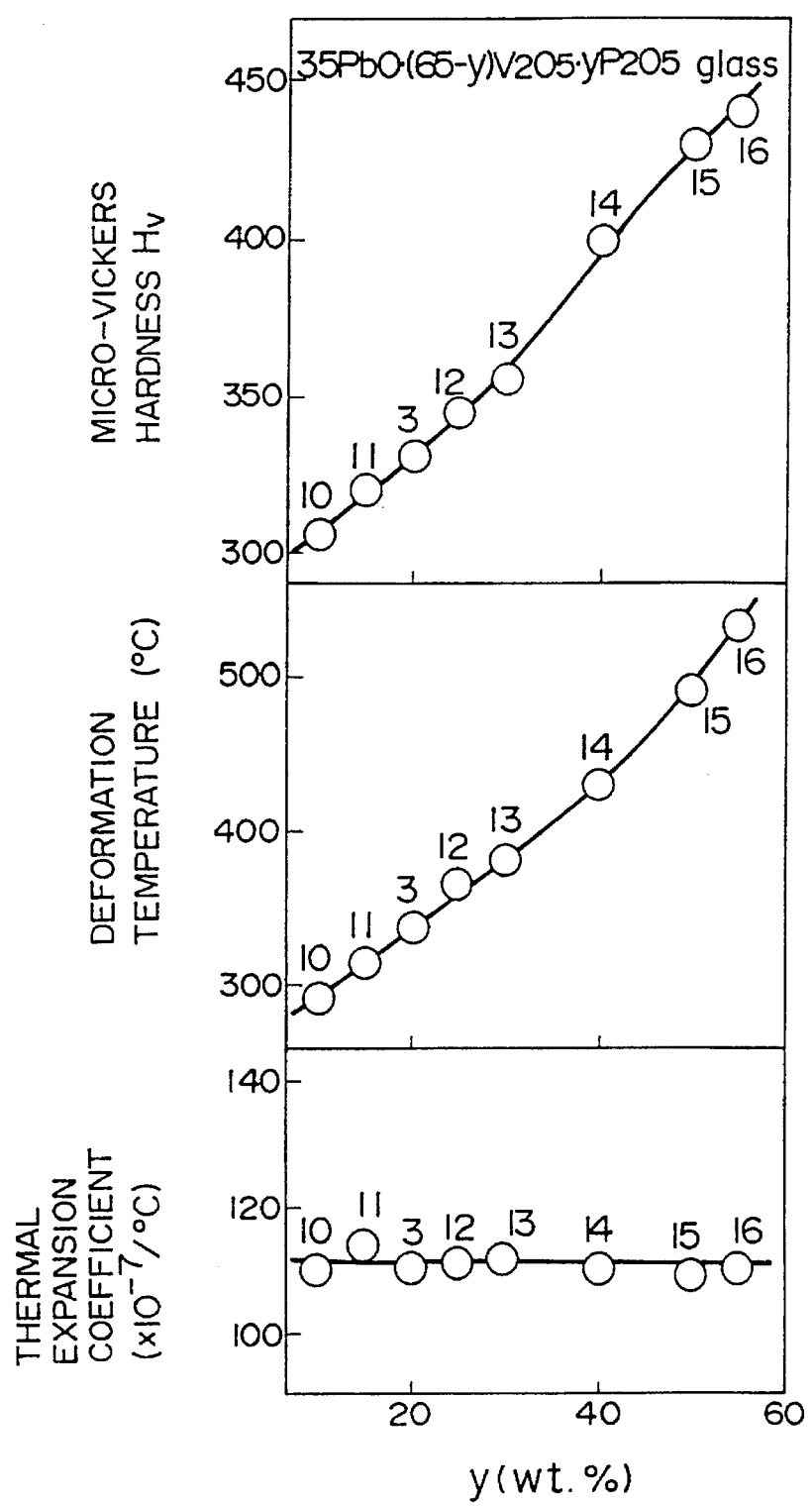
FIG. 8 shows plots of hardness, deformation temperature and thermal expansion coefficient versus composition of another glass of the PbO—$V_2O_5$—$P_2O_5$ system.
Figure 9:
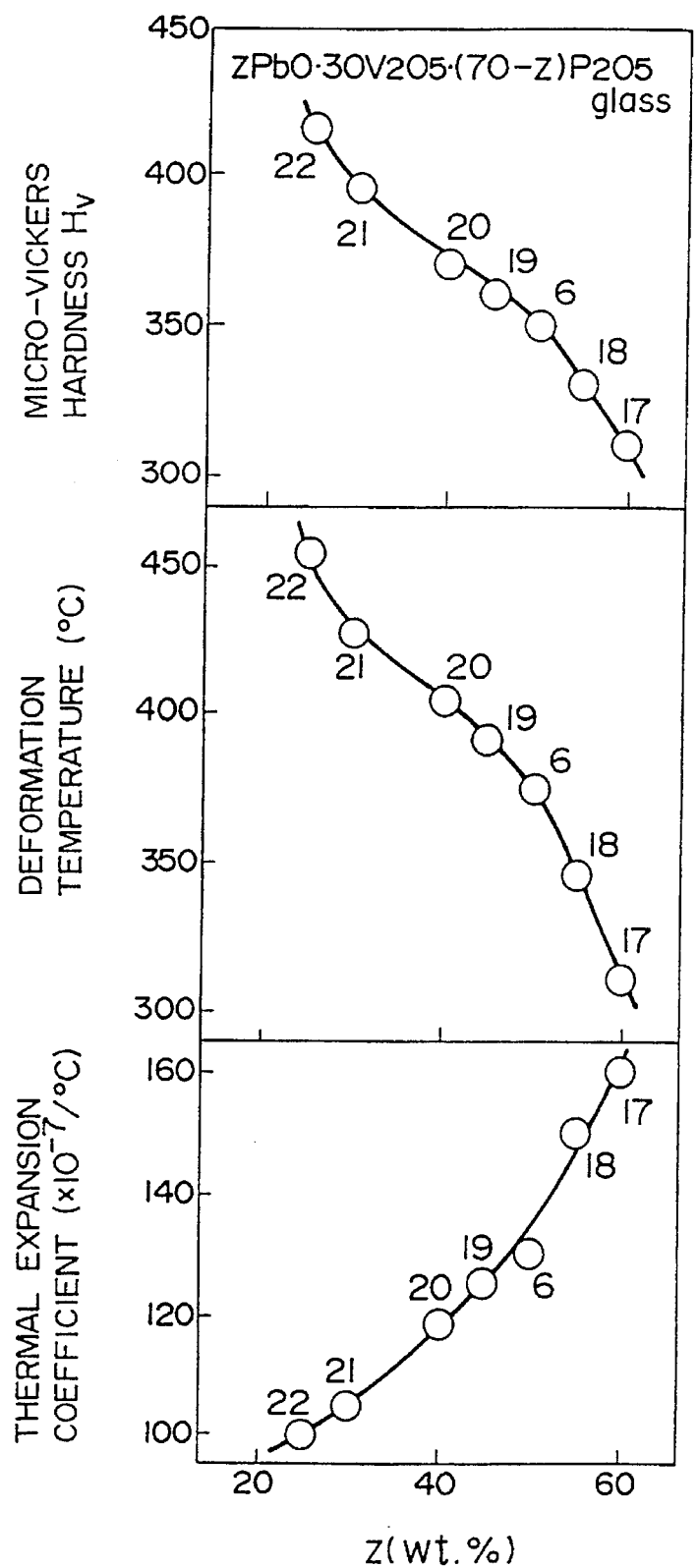
FIG. 9 shows plots of hardness, deformation temperature and thermal expansion coefficient versus composition of still another glass of the PbO—$V_2O_5$—$P_2O_5$ system.

Characteristics of the glasses within the compositional ranges as above will be explained under. FIGS. 7 to 9 show dependencies of the characteristics upon the glass composition. The numbers described near dotted circles indicate glass numbers. FIG. 7 shows effects of the content of PbO (x) and that of $V_2O_5$ with a constant content of $P_2O_5$ on the characteristics. As a result, it has been found that if PbO is increased and $V_2O_5$ is decreased, the thermal expansion coefficient, the deformation temperature, and the hardness increase. In the range of the proportion of PbO (x) of 25 to 65 wt. %, the thermal expansion coefficient varies in the range of 100 to $160\times10^{-7}/°C$., the deformation temperature in the range of 320° to 430° C., and the micro-Vickers hardness Hv in the range of 320 to 370. With respect to water resistance, good results were obtained as can be seen from Table 3. FIG. 8 shows effects of the content of $V_2O_5$ and that of $P_2O_5$ with a content of PbO being constant. As a result, it has been found that if a proportion of $P_2O_5$ (y) is increased and $V_2O_5$ is decreased, the thermal expansion coefficient does not perceptibly vary, but the deformation temperature and the hardness increase. In the range of the proportion (y) of 15 to 50 wt. %, the thermal expansion coefficient is constant at about $110\times10^{-7}/°C$. the deformation temperature varies in the range of 310 to 500° C. and the micro-Vickers hardness Hv in the range of 320 to 430. With respect to water resistance, good results were obtained as can be seen from Table 3. FIG. 9 shows effects of contents of PbO and $P_2O_5$ with a content of $V_2O_5$ being kept constant. As a result, it has been found that if a proportion of PbO (z) is increased and $P_2O_5$ is reduced, the thermal expansion coefficient increases, and the deformation temperature and the hardness reduce. In the range of the proportion of PbO (z) of 25 to 55 wt. %, the thermal expansion coefficient varies in the range of 100 to $150\times10^{-7}/°C$., the deformation temperature in the range of 460° to 340° C., and the micro-Vickers hardness, Hv in the range of 420 to 330. With respect to water resistance, good results were obtained as can be seen from Table 3.

It can be seen from above that as a major function of each glass component, PbO has an effect of controlling the thermal expansion coefficient, $V_2O_5$ reducing the deformation temperature and $P_2O_5$ increasing hardness. Therefore, the glasses having a composition comprising 25 to 65 wt. % PbO, 15 to 55 wt. % $V_2O_5$, and 15 to 50 wt. % $P_2O_5$ can freely be controlled in their thermal expansion coefficient in the range of 100 to $150\times10^{-7}/°C$., and have superior properties such as a deformation temperature of not higher than 500° C. and a micro-Vickers hardness Hv of not less than 320 so that they are suitable to bond the magnetic cores comprising the magnetic alloy film. Moreover, if the glass composition is limited to comprise 30 to 65 wt. % PbO, 15 to 55 wt. % $V_2O_5$, and 20 to 40 wt. % $P_2O_5$, the glasses can freely be controlled in their thermal expansion coefficient similarly to the above case, and simultaneously the deformation temperature can be lowered to 430° C. or lower and the micro-Vickers hardness Hv can be increased to 330 or more, as in the cases of glasses Nos. 3 to 8, 12 to 14, and 19 to 21 in Table 3, so that they are suitable as bonding glasses for the magnetic cores comprising the magnetic alloy film.

The glasses shown in Table 4 contained $Sb_2O_3$, $Bi_2O_3$, or BaO in addition to the base PbO—$V_2O_5$—$P_2O_5$ system glass. The addition of these oxides has unique effects of further enhancing the hardness and the water resistance as can clearly be seen from Table 4. At a content of these oxides exceeding 20 wt. %, however, there may be problems that the deformation temperature increases and crystallization occur as in the cases of glasses Nos. 25, 31 and 34. Therefore, one or more of $Sb_2O_3$, $Bi_2O_3$ and BaO should be contained in an amount of not higher than 20 wt. %.

The glasses shown in Tables 5 and 6 contained as a component $Tl_2O$, CdO, $Fe_2O_3$, $TiO_2$, ZnO, MgO or $Al_2O_3$ in addition to the base ternary PbO—$V_2O_5$—$P_2O_5$ system glass. Glasses Nos. 43, 44, 48, 50 and 51 contained the above component $Sb_2O_3$. Glasses Nos. 39 to 42, 45 to 47 and 49 containing $Tl_2O$ and CdO are characterized by having a lower deformation temperature and a somewhat higher thermal expansion coefficient than those of glasses not containing these components. If $Tl_2O$ and CdO are contained in an amount exceeding 10 wt. % there are produced problems of causing crystallization and reducing the water resistance as in the cases of glasses Nos. 39 and 45. In order to improve the water resistance, $Sb_2O_3$ was added as indicated in glasses Nos. 43, 44, 48, 50 and 51. As a result, the water resistance became as high as that of the glasses shown in Table 9. Glasses Nos. 52 to 61 containing $Fe_2O_3$, $TiO_2$, ZnO, MgO and $Al_2O_3$ were enhanced in hardness and water resistance due to addition of such components. However, inclusion of more than 10 wt. % thereof caused crystallization accompanied with an reduction of the thermal expansion coefficient as in the cases of glasses Nos. 53, 55, 57, 59 and 61. Therefore, the content of $Tl_2O$, CdO, $Fe_2O_3$, $TiO_2$, ZnO, MgO or $Al_2O_3$ must be 10 wt. % or less.

Using the magnetic alloy films shown in Table 1, the substrates in Table 2, and the typical bonding glasses in Tables 3 to 7, the magnetic heads as shown in Table 1 were made and evaluated.

TABLE 1

| Magnetic alloy film (%) | Saturation magnetization (G) | Thermal expansion coefficient ($\times 10^{-7}/°C$) | Heat-resistance temperature (°C) |
|---|---|---|---|
| A $Co_{93}-Nb_{13}-Zr_4$ (Co based amorphous alloy) | 9000 | 120 | 480 |
| B $Fe_{94}-Si_9-Al_7$ (Sendust alloy) | 10000 | 155 | 650 |

TABLE 2

| | Substrate | Thermal expansion coefficient ($\times 10^{-7}/°C$) | Micro-Vickers hardness Hv | Remarks |
|---|---|---|---|---|
| a | Mn—Zn ferrite | 110 | 650 | Magnetic material |
| b | MgO—NiO ceramic | 130 | 800 | Non-magnetic material |
| c | MnO—NiO ceramic | 135 | 600 | Non-magnetic material |
| d | $TiO_2$—NiO—CaO ceramic | 140 | 850 | Non-magnetic material |

TABLE 3

| No. | Glass composition (wt %) PbO | $V_2O_5$ | $P_2O_5$ | Thermal expansion coefficient ($\times 10^{-7}/°C$) | Deformation temperature (°C) | Micro-Vickers hardness Hv | Water resistance (%) | Remarks |
|---|---|---|---|---|---|---|---|---|
| 1 | 20 | 60 | 20 | 95 | 320 | 310 | 0.45 | poor water resistance |
| 2 | 25 | 55 | 20 | 100 | 325 | 320 | 0.08 | — |
| 3 | 35 | 45 | 20 | 110 | 337 | 330 | 0.04 | — |
| 4 | 40 | 40 | 20 | 117 | 342 | 335 | 0.05 | — |
| 5 | 45 | 35 | 20 | 125 | 355 | 345 | 0.03 | — |
| 6 | 50 | 30 | 20 | 130 | 375 | 350 | 0.04 | — |
| 7 | 60 | 20 | 20 | 145 | 410 | 360 | 0.02 | — |
| 8 | 65 | 15 | 20 | 156 | 430 | 365 | 0.03 | — |
| 9 | 70 | 10 | 20 | 162 | 460 | 367 | 0.04 | fragile |
| 10 | 35 | 55 | 10 | 110 | 290 | 305 | 0.06 | crystallized |
| 11 | 35 | 50 | 15 | 114 | 315 | 320 | 0.05 | — |
| 12 | 35 | 40 | 25 | 111 | 367 | 345 | 0.03 | — |
| 13 | 35 | 35 | 30 | 112 | 380 | 355 | 0.02 | — |
| 14 | 35 | 25 | 40 | 110 | 430 | 400 | 0.02 | — |
| 15 | 35 | 15 | 50 | 109 | 492 | 430 | 0.04 | — |
| 16 | 30 | 15 | 55 | 110 | 534 | 440 | 0.05 | high deformation temperature |
| 17 | 60 | 30 | 10 | 160 | 310 | 310 | 0.05 | crystallized |
| 18 | 55 | 30 | 15 | 150 | 346 | 330 | 0.06 | — |
| 19 | 45 | 30 | 25 | 125 | 390 | 360 | 0.02 | — |
| 20 | 40 | 30 | 30 | 118 | 404 | 370 | 0.03 | — |
| 21 | 30 | 30 | 40 | 105 | 428 | 395 | 0.04 | — |
| 22 | 25 | 30 | 45 | 100 | 455 | 415 | 0.05 | — |
| 23 | 25 | 20 | 55 | 98 | 525 | 425 | 0.07 | high deformation temperature |

TABLE 4

| No. | Glass composition (wt %) | | | | | | Thermal expansion coefficient ($\times 10^{-7}$/°C.) | Deformation temperature (°C.) | Micro-Vickers hardness Hv | Water resistance (%) | Remarks |
|---|---|---|---|---|---|---|---|---|---|---|---|
| | PbO | $V_2O_5$ | $P_2O_5$ | $Sb_2O_3$ | $Bi_2O_3$ | BaO | | | | | |
| 24 | 30 | 35 | 25 | 10 | — | — | 104 | 390 | 350 | <0.01 | — |
| 25 | 30 | 15 | 25 | 30 | — | — | 93 | 452 | 380 | <0.01 | crystallized |
| 26 | 35 | 20 | 25 | 20 | — | — | 100 | 415 | 360 | <0.01 | — |
| 27 | 40 | 25 | 25 | 10 | — | — | 115 | 394 | 355 | <0.01 | — |
| 28 | 45 | 30 | 20 | 5 | — | — | 122 | 377 | 350 | <0.01 | — |
| 29 | 55 | 20 | 20 | 5 | — | — | 130 | 406 | 355 | <0.01 | — |
| 30 | 60 | 15 | 20 | 5 | — | — | 138 | 426 | 365 | <0.01 | — |
| 31 | 30 | 15 | 25 | — | 30 | — | 98 | 437 | 360 | <0.01 | crystallized |
| 32 | 35 | 20 | 25 | — | 20 | — | 105 | 408 | 355 | <0.01 | — |
| 33 | 40 | 25 | 25 | — | 10 | — | 118 | 390 | 350 | <0.01 | — |
| 34 | 30 | 15 | 25 | — | — | 30 | 90 | 526 | 420 | <0.01 | high deformation temperature |
| 35 | 35 | 20 | 25 | — | — | 20 | 105 | 463 | 395 | <0.01 | — |
| 36 | 40 | 25 | 25 | — | — | 10 | 111 | 410 | 360 | <0.01 | — |
| 37 | 35 | 25 | 20 | 10 | 5 | 5 | 100 | 388 | 355 | <0.01 | |
| 38 | 40 | 25 | 20 | 5 | 5 | 5 | 120 | 355 | 355 | <0.01 | |

TABLE 5

| No. | Glass composition (wt %) | | | | | | Thermal expansion coefficient ($\times 10^{-7}$/°C.) | Deformation temperature (°C.) | Micro-Vickers hardness Hv | Water resistance (%) | Remarks |
|---|---|---|---|---|---|---|---|---|---|---|---|
| | PbO | $V_2O_5$ | $P_2O_5$ | $Sb_2O_3$ | $Tl_2O$ | CaO | | | | | |
| 39 | 30 | 30 | 20 | — | 20 | — | 134 | 330 | 325 | 0.12 | crystallized |
| 40 | 35 | 35 | 20 | — | lo | — | 130 | 338 | 320 | 0.06 | — |
| 41 | 55 | 15 | 20 | — | 10 | — | 160 | 400 | 340 | 0.04 | — |
| 42 | 45 | 20 | 25 | — | 10 | — | 140 | 363 | 345 | 0.02 | — |
| 43 | 25 | 40 | 20 | 5 | 10 | — | 110 | 325 | 320 | 0.01 | — |
| 44 | 45 | 20 | 20 | 5 | 10 | — | 126 | 350 | 340 | <0.01 | — |
| 45 | 25 | 35 | 20 | 5 | 10 | — | 128 | 348 | 335 | 0.10 | crystallized |
| 46 | 30 | 30 | 30 | — | — | 20 | 120 | 396 | 355 | 0.04 | — |
| 47 | 35 | 35 | 20 | — | — | 10 | 122 | 340 | 335 | 0.05 | — |
| 48 | 40 | 20 | 25 | 5 | — | 10 | 135 | 378 | 350 | <0.01 | — |
| 49 | 35 | 35 | 20 | — | 5 | 5 | 125 | 340 | 325 | 0.06 | — |
| 50 | 40 | 20 | 25 | 5 | 5 | 5 | 137 | 366 | 350 | <0.01 | — |
| 51 | 40 | 15 | 20 | 10 | 5 | 5 | 145 | 413 | 355 | <0.01 | — |

TABLE 6

| No. | Glass composition (wt %) | | | | | | | | Thermal expansion coefficient ($\times 10^{-7}$/°C.) | Deformation temperature (°C.) | Micro-Vickers hardness Hv | Water resistance (%) | Remarks |
|---|---|---|---|---|---|---|---|---|---|---|---|---|---|
| | PbO | $V_2O_5$ | $P_2O_5$ | $Fe_2O_3$ | $TiO_2$ | ZnO | MgO | $Al_2O_3$ | | | | | |
| 52 | 40 | 25 | 25 | 10 | — | — | — | — | 104 | 382 | 355 | <0.01 | crystallized |
| 53 | 35 | 20 | 25 | 20 | — | — | — | — | 95 | 430 | 360 | <0.01 | — |
| 54 | 40 | 25 | 25 | — | 10 | — | — | — | 105 | 385 | 360 | <0.01 | — |
| 55 | 35 | 20 | 25 | — | 20 | — | — | — | 91 | 433 | 370 | <0.01 | — |
| 56 | 40 | 25 | 25 | — | — | 10 | — | — | 110 | 376 | 345 | <0.01 | — |
| 57 | 35 | 20 | 25 | — | — | 20 | — | — | 97 | 432 | 360 | <0.01 | — |
| 58 | 40 | 25 | 25 | — | — | — | 10 | — | 113 | 370 | 340 | <0.01 | crystallized |
| 59 | 35 | 20 | 25 | — | — | — | 20 | — | 105 | 435 | 355 | <0.01 | — |
| 60 | 40 | 25 | 25 | — | — | — | — | 10 | 102 | 392 | 360 | <0.01 | — |
| 61 | 35 | 20 | 25 | — | — | — | — | 20 | 96 | 442 | 370 | <0.01 | — |

TABLE 7

| No. | Glass composition (wt %) | | | | | | | | Thermal expansion coefficient ($\times 10^{-7}/°C.$) | Deformation temperature (°C.) | Micro-Vickers hardness Hv | Water resistance (%) | Remarks |
| --- | --- | --- | --- | --- | --- | --- | --- | --- | --- | --- | --- | --- | --- |
| | PbO | $B_2O_3$ | $SiO_2$ | $Al_2O_3$ | CdO | $Tl_2O$ | $V_2O_5$ | $Na_2O$ | | | | | |
| 62 | 82 | 12 | 3 | 3 | — | — | — | — | 105 | 365 | 300 | 0.24 | |
| 63 | 84 | 11 | 4 | 1 | — | — | — | — | 110 | 372 | 295 | 0.23 | |
| 64 | 85 | 13 | 1 | 1 | — | — | — | — | 118 | 357 | 270 | 2.01 | |
| 65 | 88 | 12 | — | — | — | — | — | — | 125 | 330 | 260 | 3.45 | |
| 66 | 80 | 12 | — | — | 8 | — | — | — | 132 | 320 | 260 | 3.10 | |
| 67 | 77 | 9 | — | — | 14 | — | — | — | 142 | 314 | 250 | 4.84 | |
| 68 | 53 | 8 | — | — | — | 30 | 9 | — | 155 | 303 | 255 | 5.39 | |
| 69 | 76 | 19 | — | — | — | — | — | 5 | 160 | 330 | 250 | 4.93 | |

Example 1

Co based amorphous alloy, $Co_{83}$—$Nb_{13}$—$Zr_4$ was used for forming a magnetic alloy film, and as a substrate for the film, Mn—Zn ferrite was employed. Adequate bonding glasses were selected from those indicated in Tables 3 to 7 in view of the heat-resistance temperature of the magnetic alloy film and the thermal expansion coefficients of the magnetic alloy film and the substrate. With these materials, magnetic heads as shown in FIG. 1 were made and evaluated. The results are presented in Table 8. Bonding temperature is a temperature at which the bondings are formed by filling the glass in place and fusing it in the course of manufacturing the magnetic heads and which the glass exhibits a viscosity of about $10^4$ poise. This temperature varies depending upon the type of glass. Yield of head production is that obtained after processing and assembling in production of the magnetic heads. Head chip strength was evaluated by determining a load under which the resulting magnetic heads were broken. Abrasion test with a tape running at indicated speeds was conducted by fixing a resulting head on a cylinder of VTR and allowing a metal tape to run at a relative speed of 3.75 m/sec., 5.8 m/sec., and 11 m/sec. for 300 hours, and observing the surface of the magnetic head in contact with the running tape for extents of depression, scratches and deposition of recording medium to evaluate the resistance to abrasion and durability.

When prior glasses Nos. 62 to 64 were employed for bonding the magnetic cores, their thermal expansion coefficients match to some extent those of the $Co_{83}$—$Nb_{13}$—$Zr_4$ amorphous alloy and Mn—Zn ferrite resulting in a yield of 66 to 78%. However, these glasses have inferior mechanical properties so that good head chip strength can not be obtained resulting in defect of reliability. In the abrasion test with running tapes, good results were obtained at a relative speed of tape of 3.75 m/sec., while at 5.8 m/sec. and 11 m/sec., the glass bondings were depressed to a large extent and scratched by friction with running tapes. Moreover, recording mediums were deposited on the boundary between the bonding glass and the magnetic alloy film. Deposition of recording mediums on the magnetic heads impairs the magnetic properties of the magnetic heads.

When prior glasses Nos. 65 and 66 were employed as bonding glasses, yield of head production and head chip strength were very lowered. This is because the thermal expansion coefficients of the glasses Nos. 65 and 66 are higher than those of the $Co_{83}$—$Nb_{13}$—$Zr_4$ amorphous alloy and the Mn—Zn ferrite to frequently cause cracking, fracture and erosion with a washing liquid. In the abrasion test with running tapes, an amount of the glass bondings abraded is higher than that in the cases of glasses Nos. 62 and 64 used, diminishing greatly the reliability of the magnetic heads.

As described above, it has found that the use of prior glasses Nos. 62 to 66 resulted in unsatisfactory magnetic heads. In contrast to these Comparative Examples, when glasses Nos. 2, 3, 4, 28 and 5 having a thermal expansion coefficient matching to some extent those of the $Co_{83}$—$Nb_{13}$—$Zr_4$ amorphous alloy and the Mn—Zn ferrite were employed in Examples, the excellent mechanical properties and water resistance allowed to achieve good results in head chip strength and abrasion test with running tapes. No reduction in magnetic properties was observed. However, with glass No. 2, as its micro-Vickers hardness Hv 320 was lower than those of other glasses, the glass bondings were greatly abraded with tapes running at a relative speed of 11 m/sec. As the micro-Vickers hardness of the glass No. 3 was 330, it has been found that if the micro-Vickers hardness is 330 or more, good resistance to abrasion would be obtained even at a relative speed of tape of 11 m/sec. On the other hand, with glasses Nos. 6 and 42, owing to the large thermal expansion coefficients thereof the glass bondings were subjected to tensile stress and the glasses were in the state liable to fracture. Therefore, yield of head production and head chip strength were lower than those with glasses in the Examples as described above. In the abrasion test with running tapes, glasses Nos. 6 and 42 produced no problem in abrasion even at a relative speed of tape of 11 m/sec. unlike the glass No. 2. Therefore, the magnetic heads with particularly glasses Nos. 3, 4, 28 and 5 were excellent in magnetic properties, resistance to abrasion, durability, and mass-producibility. Such magnetic heads have an great effect on enhancement of the performance of magnetic recording and reproducing systems such as VTR.

TABLE 8

| Bonding glass No. | Bonding temperature (°C.) | Yield of head production (%) | Head chip strength (g) | Abrasion test with running tapes (Resistance to abrasion) | | |
|---|---|---|---|---|---|---|
| | | | | 3.75 m/sec | 5.8 m/sec | 11 m/sec |
| Example | | | | | | |
| 2 | 420 | 91 | 44 | good | good | poor |
| 3 | 420 | 95 | 52 | good | good | good |
| 4 | 420 | 94 | 55 | good | good | good |
| 28 | 480 | 96 | 56 | good | good | good |
| 5 | 450 | 85 | 51 | good | good | good |
| 6 | 480 | 65 | 40 | good | good | good |
| 42 | 450 | 30 | 32 | good | good | good |
| Comparative Example | | | | | | |
| (62) | 480 | 72 | 32 | good | poor | poor |
| (63) | 480 | 78 | 35 | good | poor | poor |
| (64) | 450 | 66 | 18 | good | poor | poor |
| (65) | 420 | 31 | 15 | poor | poor | poor |
| (66) | 420 | 12 | 14 | poor | poor | poor |

Example 2

$Co_{83}$—$Nb_{13}$—$Zr_4$ amorphous alloy was used for forming a magnetic alloy film, and as a substrate for the film, MgO-NiO ceramic was employed to produce magnetic heads as shown in FIG. 1. Glasses used for bonding magnetic cores and the results obtained from evaluation of the magnetic heads are shown in Table 9. Bonding glasses capable of working in the temperature range where the $Co_{83}$—$Nb_{13}$—$Zr_4$ amorphous alloy was not crystallized were selected. Evaluation procedure was the same as in Example 1.

Magnetic heads of comparative examples using prior glasses Nos. 62 to 66 were unsatisfactory in yield of head production, head chip strength and resistance to abrasion with running tapes. In contrast with this, magnetic heads in Examples except glass No. 50 produced good results. No deterioration of the magnetic properties was observed. Particularly, magnetic heads with glasses Nos. 12, 38, 47 and 44 produced excellent results, as clearly seen from Table 9. This is because glasses Nos. 12, 38, 47 and 44 have a thermal expansion coefficient near those of the $Co_{83}$—$Nb_{13}$—$Zr_4$ amorphous alloy and the MgO—NiO ceramic, and moreover, are excellent in mechanical properties and water resistance. These magnetic heads comprised a substances of MgO—NiO ceramic non-magnetic material so that they had a superior high frequency recording and reproducing characteristic to those of the magnetic heads of Example 1.

Magnetic heads using glass No. 50 produced a lower yield of head production and a lower head chip strength than those of other heads in the Example because the glasses have a higher thermal expansion coefficient than those of the $Co_{83}$—$Nb_{13}$—$Zr_4$ amorphous alloy and the MgO—NiO ceramic. Magnetic heads using glass No. 37 are somewhat lower in yield of head production and head chip strength because the glass is too low in thermal expansion coefficient comparing with that of the MgO—NiO ceramic. The use of glass No. 40 produced a large amount of glass bondings abraded at a relative speed of tape of 11 m/sec., because the micro-Vickers hardness Hv of the glass was 320 and lower than those of other glasses in the Example. Other glasses in the Example had a high micro-Vickers hardness Hv of 330 or more.

As above, the magnetic heads using glasses Nos. 12, 38, 47 and 44 are excellent in magnetic properties, resistance to abrasion, durability, and mass-producibility so that they have a great advantage on enhancement of the magnetic recording and reproducing systems such as VTR.

TABLE 9

| Bonding glass No. | Bonding temperature (°C.) | Yield of head production (%) | Head chip strength (g) | Abrasion test with running tapes (Resistance to abrasion) | | |
|---|---|---|---|---|---|---|
| | | | | 3.75 m/sec | 5.8 m/sec | 11 m/sec |
| Example | | | | | | |
| 37 | 480 | 82 | 42 | good | good | good |
| 12 | 480 | 92 | 53 | good | good | good |
| 38 | 460 | 95 | 55 | good | good | good |
| 47 | 460 | 95 | 54 | good | good | good |
| 44 | 460 | 96 | 55 | good | good | good |
| 40 | 420 | 89 | 45 | good | good | poor |
| 50 | 480 | 57 | 38 | good | good | good |
| Comparative Example | | | | | | |
| (62) | 480 | 63 | 30 | good | poor | poor |
| (63) | 480 | 70 | 36 | good | poor | poor |
| (64) | 450 | 70 | 25 | poor | poor | poor |
| (65) | 420 | 32 | 20 | poor | poor | poor |
| (66) | 420 | 20 | 16 | poor | poor | poor |

Example 3

$Co_{83}$—$Nb_{13}$—$Zr_4$ amorphous alloy was used for forming a magnetic alloy film, and as a substrate for the film, MnO—NiO ceramic was employed to produce magnetic heads as shown in FIG. 1. Glasses used for bonding magnetic cores and the results obtained from evaluation of the magnetic heads are shown in Table 10. Bonding glasses capable of working in the temperature range where the $Co_{83}$—$Nb_{13}$—$Zr_4$ amorphous alloy was not crystallized were selected. Evaluation procedure was the same as in Example 1.

Magnetic heads of comparative examples using prior glasses Nos. 63 to 67 were unsatisfactory in yield of head production, head chip strength and resistance to abrasion with running tapes. In contrast with this, magnetic heads in Examples produced good results. No deterioration of the magnetic properties was observed. Particularly, magnetic heads with glasses Nos. 27, 38, and 48 produced excellent results, as clearly seen from Table 10. This is because the glasses Nos. 27, 38, and 48 have a thermal expansion coefficient near those of the $Co_{83}$—$Nb_{13}$—$Zr_4$ amorphous alloy and the MnO—NiO ceramic, and moreover, are excellent in mechanical properties and water resistance. These magnetic heads were comprised of the MnO—NiO ceramic as non-magnetic material, so that, similarly to the magnetic heads of Example 2, they had a superior high frequency recording and reproducing characteristic to those of the magnetic heads of Example 1. Magnetic heads using glasses Nos. 24, 56 and 42 were somewhat lower in yield of head production and head chip strength, because the glasses have a thermal expansion coefficient not matching a little those of the $Co_{83}$—$Nb_{13}$—$Zr_4$ amorphous alloy and the MgO—NiO ceramic. Magnetic heads using glass No. 49 are somewhat inferior in mechanical properties such as hardness did not achieve such characteristics as those using glasses Nos. 27, 28, 38 and 48.

As above, the magnetic heads using glasses Nos. 27, 38, and 48 are excellent in magnetic properties, resistance to abrasion, durability, and mass-producibility so that they have a great advantage on enhancement of the magnetic recording and reproducing systems such as VTR.

shown in FIG. 1. Glasses used for bonding magnetic cores and the results obtained from evaluation of the magnetic heads are shown in Table 11. Evaluation procedure was the same as in Example 1.

Magnetic heads of comparative examples using prior glasses Nos. 65 to 69 were significantly low in yield of head production and head chip strength, and the glass bondings were so liable to abrade that they could not use in the high performance magnetic recording and reproducing systems. In contrast with this, magnetic heads in Examples produced good results as clearly seen from the Table 11. Particularly, magnetic heads using glasses Nos. 19, 6 and 30 produce excellent results. This is because the glasses Nos. 16, 6 and 30 have a thermal expansion coefficient near that of the MnO—NiO ceramic. These magnetic heads did not perceivably deteriorate in magnetic properties and had superior recording and reproducing properties in the region of high frequency. However, magnetic heads using glasses Nos. 13 and 20 produced deterioration of magnetic properties because the glasses have a too low thermal expansion coefficient comparing with that of the $Fe_{84}$—$Si_9$—$Al_7$ alloy. With magnetic heads using glasses Nos. 7 and 8, no deterioration of magnetic properties was observed, but the yield of head production was lower than in the cases of other magnetic heads in Example because the thermal expansion coefficients of the glasses Nos. 7 and 8 were higher than that of MnO—NiO ceramic.

As above, the magnetic heads using glasses Nos. 19, 6 and 30 are excellent in magnetic properties, resistance to abrasion, durability, and mass-producibility so that they have a great advantage on enhancement of the magnetic recording and reproducing systems such as VTR.

TABLE 10

|  | Bonding glass No. | Bonding temperature (°C.) | Yield of head production (%) | Head chip strength (g) | Abrasion test with running tapes (Resistance to abrasion) | | |
|---|---|---|---|---|---|---|---|
|  |  |  |  |  | 3.75 m/sec | 5.8 m/sec | 11 m/sec |
| Example | 24 | 480 | 73 | 45 | good | good | good |
|  | 56 | 480 | 80 | 48 | good | good | good |
|  | 27 | 480 | 92 | 54 | good | good | good |
|  | 38 | 450 | 93 | 53 | good | good | good |
|  | 49 | 450 | 80 | 47 | good | good | poor |
|  | 48 | 480 | 86 | 50 | good | good | good |
|  | 42 | 480 | 68 | 40 | good | good | good |
| Comparative Example | (63) | 480 | 65 | 35 | good | poor | poor |
|  | (64) | 450 | 67 | 28 | poor | poor | poor |
|  | (65) | 420 | 40 | 22 | poor | poor | poor |
|  | (66) | 420 | 40 | 20 | poor | poor | poor |
|  | (67) | 420 | 12 | 11 | poor | poor | poor |

Example 4

Sendust alloy, $Fe_{84}$—$Si_9$—$Al_7$ was used for forming a magnetic alloy film, and as a substrate for the film, MnO—NiO ceramic was employed to produce magnetic heads as

TABLE 11

| | Bonding glass No. | Bonding temperature (°C.) | Yield of head production (%) | Head chip strength (g) | Abrasion test with running tapes (Resistance to abrasion) | | |
|---|---|---|---|---|---|---|---|
| | | | | | 3.75 m/sec | 5.8 m/sec | 11 m/sec |
| Example | 13 | 500 | 68 | 47 | good | good | good |
| | 20 | 550 | 75 | 58 | good | good | good |
| | 19 | 500 | 86 | 60 | good | good | good |
| | 6 | 480 | 90 | 53 | good | good | good |
| | 30 | 580 | 92 | 57 | good | good | good |
| | 7 | 550 | 67 | 51 | good | good | good |
| | 8 | 550 | 53 | 43 | good | good | good |
| Comparative Example | (65) | 420 | 34 | 20 | poor | poor | poor |
| | (66) | 420 | 36 | 22 | poor | poor | poor |
| | (67) | 420 | 18 | 13 | poor | poor | poor |
| | (68) | 420 | 21 | 13 | poor | poor | poor |
| | (69) | 420 | 7 | 10 | poor | poor | poor |

Example 5

$Fe_{84}$—$Si_9$—$Al_7$ alloy was used for forming a magnetic alloy film, and as a substrate for the film, $TiO_2$—NiO—CaO ceramic was employed to produce magnetic heads as shown in FIG. 1. Glasses used for bonding magnetic cores and the results obtained from evaluation of the magnetic heads are shown in Table 12. Evaluation procedure was the same as in Example 1.

Magnetic heads of comparative examples using prior glasses Nos. 65 to 67 were significantly low in yield of head production and head chip strength, and the glass bondings were so liable to abrade that they could not use in the high performance magnetic recording and reproducing systems. In contrast with this, magnetic heads in Example produced good results as clearly seen from the Table 12. Particularly, magnetic heads using glasses Nos. 29, 30 and 51 produced excellent results. This is because the glasses Nos. 29, 30 and 51 have a thermal expansion coefficient near that of the $TiO_2$—NiO—CaO ceramic. No deterioration of these magnetic heads was observed, and good recording and reproducing characteristics were produced in the region of high frequency. However, magnetic heads using glasses Nos. 36 and 20 produced deterioration of the magnetic properties, because the glasses have a too low thermal expansion coefficient comparing with that of the $Fe_{84}$—$Si_9$—$Al_7$ alloy. With magnetic heads using glasses Nos. 18 and 41, no deterioration of magnetic characteristics was observed, but the yield of head production and the head chip strength was lower than in the cases of the magnetic heads in the other Examples, because the thermal expansion coefficients of the glasses were higher than that of $TiO_2$—NiO—CaO ceramic.

Figure 10:
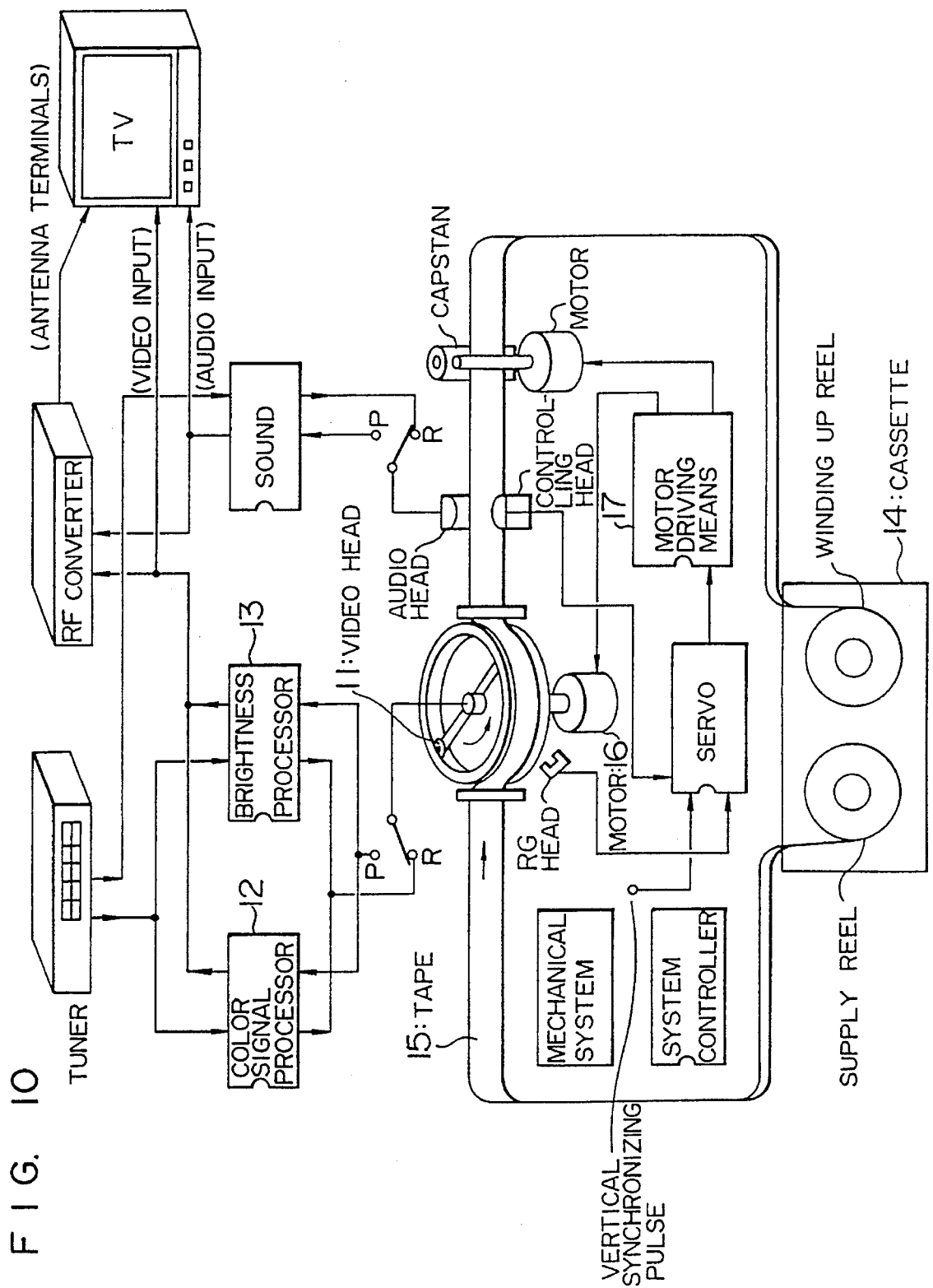
FIG. 10 shows a diagrammatical arrangement of an embodiment of VTR in accordance with the present invention.

As above, the magnetic heads using glasses Nos. 29, 30 and 51 are excellent in magnetic properties, resistance to abrasion, durability, and mass-producibility so that they have a great effect on enhancement of the magnetic recording and reproducing systems such as VTR. FIG. 10 shows a diagrammatical arrangement of an example of VTR comprising one of the aforementioned magnetic heads. Video head, magnetic head 11 is connected with color signal processor 12 and brightness signal processor 13 for processing informations taken by the head to read out and reproduce the informations from recording tape 15 of cassette 14, or to record the informations thereinto. Video head 11 is also connected with motor 16 and a driving system including a motor driving means 17.

TABLE 12

| | Bonding glass No. | Bonding temperature (°C.) | Yield of head production (%) | Head chip strength (g) | Abrasion test with running tapes (Resistance to abrasion) | | |
|---|---|---|---|---|---|---|---|
| | | | | | 3.75 m/sec | 5.8 m/sec | 11 m/sec |
| Example | 36 | 550 | 78 | 52 | good | good | good |
| | 20 | 550 | 83 | 57 | good | good | good |
| | 29 | 550 | 91 | 63 | good | good | good |
| | 30 | 580 | 93 | 60 | good | good | good |
| | 51 | 550 | 88 | 61 | good | good | good |
| | 18 | 450 | 75 | 44 | good | good | good |
| | 41 | 550 | 60 | 47 | good | good | good |
| Comparative Example | (65) | 420 | 28 | 18 | poor | poor | poor |
| | (66) | 420 | 40 | 25 | poor | poor | poor |
| | (67) | 420 | 24 | 15 | poor | poor | poor |
| | (68) | 420 | 28 | 20 | poor | poor | poor |
| | (69) | 420 | 11 | 12 | poor | poor | poor |

What is claimed is:

1. A magnetic head comprising a pair of magnetic cores each having a substrate and a magnetic alloy film formed on said substrate, which are disposed such that said magnetic alloy films are opposed to and spaced from each other by a gap, and glass bondings disposed in said gap between said magnetic alloy films to integrate said pair of magnetic cores, the glass of said glass bondings being composed of a glass having a composition comprising 25 to 65 wt. % PbO, 15 to 55 wt. % $V_2O_5$, 15 to 50 wt. % $P_2O_5$, as major components, and satisfying all the following conditions:

(1) a thermal expansion coefficient over $100\times10^{-7}$ and up to $160\times10^{-7}/°C.$, (2) a deformation temperature of 325° C. to 500° C., and (3) a micro-Vickers hardness Hv of 320 to 430.

2. A magnetic head according to claim 1, wherein said glass further contains 20 wt. % or less of at least one component selected from the group consisting of $Sb_2O_3$, $Bi_2O_3$, and BaO, or 10 wt. % or less of at least one component selected from the group consisting of $Tl_2O$, $Fe_2O_3$, $TiO_2$, ZnO, CdO, MgO and $Al_2O_3$.

3. A magnetic head according to claim 1, wherein said magnetic alloy film has a thermal expansion coefficient in the range of 110 to $170\times10^{-7}/°C.$ 4. A magnetic head according to claim 1, wherein sad glass of said glass bondings further comprises up to 20 wt % $Sb_2O_3$.

5. A magnetic head provided by a process which comprises the steps of cutting channels in a substrate to form ridges, sputtering a magnetic alloy film on the surfaces of the channels and ridges, filling a bonding glass composed of a glass comprising 25 to 65 wt. % PbO, 15 to 55 wt. % $V_2O_5$ and 15 to 50 wt. % $P_2O_5$ as major components, and having a thermal expansion coefficient higher than $100\times10^{-7}/°C.$ and up to $160\times10^{-7}/°C.$ in the channels at a temperature lower than the heat-resistance temperature of the magnetic alloy film, grinding off excess top portions of the glass and the magnetic alloy film on said ridges to form a flat surface having stripe-like surfaces of said magnetic alloy film exposed above the tops of said ridges and cutting the resulting body along a predetermined line to produce a pair of magnetic core blocks, sputtering a non-magnetic spacer material on said flat surface, abutting said pair of magnetic core blocks face to face with the stripe-like surface of the magnetic alloy film of one of the blocks mating those of the other block, bonding the blocks at a temperature below the heat-resistance temperature of said magnetic alloy film, and cutting the resulting assembly parallel to said ridges into magnetic head units.

6. A magnetic head according to claim 5, wherein said magnetic alloy film has a thermal expansion coefficient in the range of 110 to $170\times10^{-7}/°C.$ 7. A magnetic head comprising a pair of magnetic cores each having a substrate and a magnetic alloy film formed on said substrate, which are disposed such that said magnetic alloy films are opposed to and spaced from each other by a gap, glass bondings disposed in said gap between said magnetic alloy films to integrate said pair of magnetic cores, the glass of said glass bondings being composed of a glass satisfying all the following conditions:

(1) a thermal expansion coefficient over $100\times10^{-7}/°C.$ and up to $160\times10^{-7}/°C.$, (2) a composition comprising 25 to 65 wt. % PbO, 15 to 55 wt. % $V_2O_5$ and 15 to 50 wt. % of $P_2O_5$, (3) a deformation temperature of 325° C. to 500° C., and (4) a micro-Vickers hardness Hv of 320 to 430.

8. The magnetic head according to claim 7, wherein said glass further contains at least one component selected form the group consisting of $Sb_2O_3$, $Bi_2O_3$, BaO $Tl_2O$, $Fe_2O_3$, $TiO_2$, ZnO, CdO, MgO and $Al_2O_3$.

9. A magnetic head according to claim 7, wherein said magnetic alloy film of each of said pair of magnetic cores has a thermal expansion coefficient in the range of 110 to $170\times10^{-7}/°C.$ 10. A magnetic head according to claim 7, wherein said glass of said glass bondings further comprises up to 20 wt % $Sb_2O_3$.

* * * * *